United States Patent [19]

Huber

[11] E Re. 28,933

[45] Reissued Aug. 17, 1976

[54] HYDRAULIC TORQUE MOTOR

[75] Inventor: Mortimer J. Huber, White Bear Lake, Minn.

[73] Assignee: Gresen Manufacturing Company, Minneapolis, Minn.

[22] Filed: Dec. 17, 1970

[21] Appl. No.: 99,330

Related U.S. Patent Documents

Reissue of:

[64] Patent No.: 3,391,608
Issued: July 9, 1968
Appl. No.: 564,086
Filed: July 11, 1966

[52] U.S. Cl. ..... 418/61 B
[51] Int. Cl.[2] ..... F01C 1/02
[58] Field of Search ..... 418/61, 171

[56] References Cited

UNITED STATES PATENTS

| | | | |
|---|---|---|---|
| 10,778 | 11/1886 | Tilden | 73/256 |
| 372,440 | 11/1887 | Tilden | 73/256 |
| 443,289 | 4/1890 | Tilden | 73/256 |
| 459,332 | 9/1891 | Nash | 73/256 |
| 2,989,951 | 6/1961 | Charlson | 418/61 |
| 3,139,853 | 7/1964 | Wilkenson | 418/61 |
| 3,215,043 | 10/1965 | Huber | 418/61 |
| 3,316,814 | 5/1967 | Charlson | 418/61 |
| 3,431,863 | 11/1969 | Waldorff | 418/61 |

*Primary Examiner*—William L. Freeh
*Attorney, Agent, or Firm*—Warren A. Sturm

[57] ABSTRACT

A fluid operated device in which an externally toothed rotor is rotatably disposed in a chamber and an internally toothed member is orbitally but not rotatably disposed in the chamber about the rotor. The rotor and orbital member are operative upon relative rotation to form fluid containing pockets therebetween and suitable fluid ducts are provided for conveying fluid to and from the fluid containing pockets. The orbital member is provided with means to cooperatively engage the housing to limit, or prevent unidirectional rotational motion of the orbiting member but to allow orbital movement about the axis of rotation of the rotor.

34 Claims, 7 Drawing Figures

INVENTOR
MORTIMER J. HUBER
BY Robert M. Dunning
ATTORNEY

INVENTOR
MORTIMER J. HUBER
BY Robert M. Dunning
ATTORNEY

INVENTOR
MORTIMER J. HUBER
BY Robert M. Dunning
ATTORNEY

HYDRAULIC TORQUE MOTOR

Matter enclosed in heavy brackets [ ] appears in the original patent but forms no part of this reissue specification; matter printed in italics indicates the additions made by reissue.

This invention relates to an improvement in hydraulic torque motors and deals particularly with a torque motor which may be produced at a very low cost.

During the last few years many types of hydraulic motors have been produced which are capable of transforming hydraulic pressure into a rotary movement. One form of hydraulic motor includes a rotor housing providing a rotor chamber having rounded lobes projecting inwardly from the peripheral wall of the chamber. An externally lobed rotor is rotatable within the housing. This rotor is provided with one less lobe than is the peripheral housing and is so designed that the external lobes of the rotor continuously seal against the wall of the rotor chamber. As a result of the difference in the number of lobes each lobe of the rotor enters the subsequent space between the lobe and the housing, and the axis of the rotor travels along an orbital path.

In my previous structure illustrated in Pat. No. 3,215,043, I disclosed a structure which was an improvement over the previous structures in that the wobble shaft on which the rotor of the earlier structure was mounted was eliminated, and the rotor was mounted on a shaft which was concentric with the outer housing. In this construction, a floating internal gear was provided which acted as a valve or port plate, and which traveled in an orbital path about the axis of the rotor. The gear member included an internally lobed element which cooperated with the external lobes of the rotor much in the same manner as the orbitally mounted rotor of the previous structure operated in the internally lobed member. The orbitally movable gear member was capable of driving a driven member at varying speeds depending upon a ratio and the number of teeth on the gear member and on the axial cooperable driven gear.

The present invention also includes a rotor which is coaxial with the housing, and an internally lobed cooperable member which travels in an orbital path. However, in the present arrangement, the orbital member is held from rotation, but at the same time in an orbital path in such a manner as to open and close the pressure and return ports at the proper time. In other words, the orbitally movable internally lobed member serves as a valve or port plate to open and close the inlet and outlet openings in a manner to drive the rotor, the direction of orbital movement being opposite the direction of rotation of the rotor.

A feature of the present invention resides in the provision of a device somewhat similar to that disclosed in my above mentioned previous patent, but in which the internally lobed orbital member is held from rotation within the housing. This is accomplished by providing a series of external teeth on the orbitally moving member, and by providing a similar number of internal teeth on the inner surface of the housing. In order to permit the orbital movement of the internally lobed member, the space between the internal teeth on the housing is considerably greater than the width of the external teeth on the orbital member. As a result this member may travel in an orbital path, but still be held from rotation about the axis of the rotor.

A feature of the present invention resides in the simplicity of the motor thus formed. In its simplest form, the device includes a two part housing including an intermediate chamber forming plate and a porting plate, a rotor, an internally lobed orbital member, and a means for holding the parts together. These structures can accordingly be formed for an extremely low cost compared with previous structures designed to accomplish similar results.

A further feature of the present invention resides in the provision of a device of the type described in which the orbitally movable member controls the opening and closing of a number of inlet and outlet ports which are equal in number to the number of internal lobes on this member. For example, on the specific form of construction illustrated, the rotor is provided with six (6) external lobes, and the orbital member is provided with seven (7) inwardly extending lobes. In this arrangement, the orbital member acts to open and close, in sequence seven inlet ports and seven outlet ports, thereby controlling the rotation of a rotor. For each orbit of the internally lobed member, the rotor advances a distance equal to the angular distance between the lobes of the internally lobed member. A further feature of the present invention resides in the fact that, if desired, porting plates may be provided on both sides of the rotor and orbital member, with the ports of one porting plate in opposed relation to the ports of the other. As a result, the pressure entering the motor may be equalized from opposite sides, thus virtually eliminating friction.

These and other objects and novel features of the present invention will be more clearly and fully set forth in the following specification and claims. In the drawings forming a part of the specification paragraph:

Figure 1:
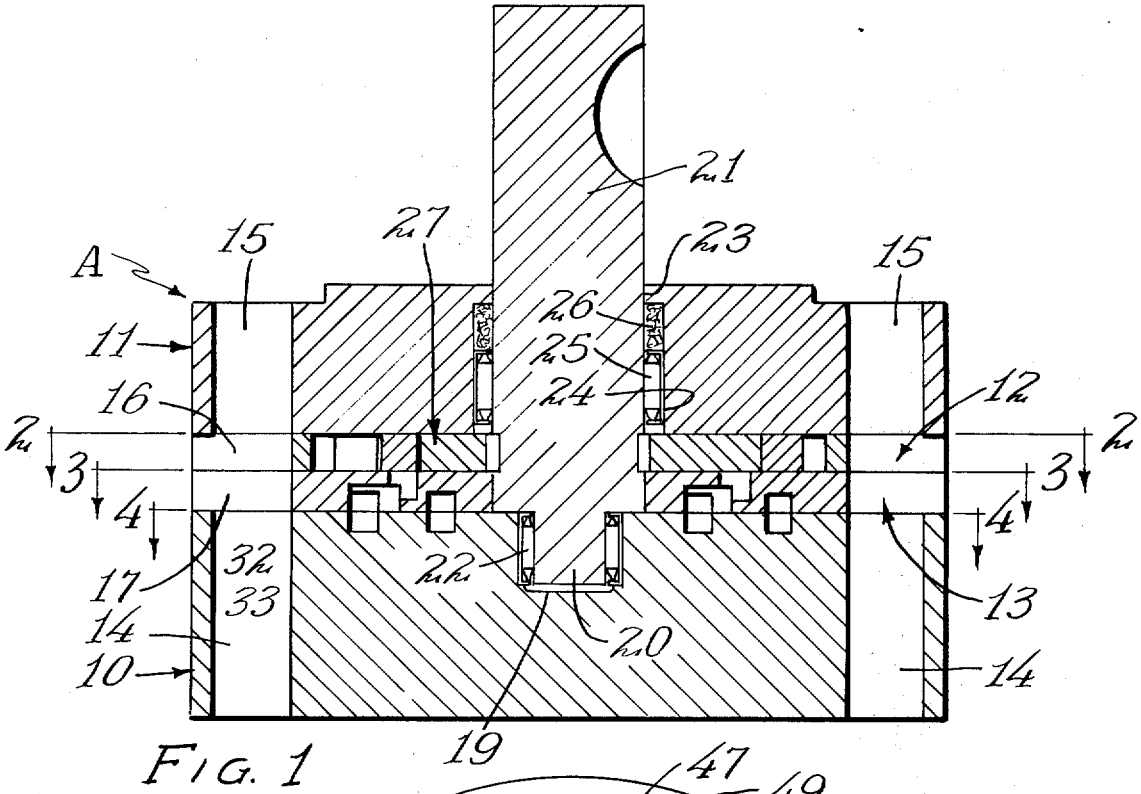
FIG. 1 is a vertical sectional view through the hydraulic torque motor, showing the general arrangement of parts therein.

The hydraulic torque motor is indicated in general by the letter A and includes a pair of housing members 10 and 11, a hydraulic chamber forming member 12, and a porting plate 13. The hydraulic chamber forming member 12 and the porting plate 13 are sandwiched between the housing members 10 and 11. Diametrically opposed aligned apertures 14 and 15 are provided in the housing members 10 and 11 designed to accommodate the fastening means for securing a motor in a desired position. Diametrically opposed notches 16 and 17 are provided in the chamber forming member 12 and the porting plate 13, respectively, the notches 16 and 17 being designed to accommodate the fastening means extending through the aligned apertures 14, 15.

The housing member 10 is provided with a central socket 19 designed to accommodate the lower reduced end portion 20 of a driven shaft 21, a bearing interposed between a wall of the socket 19 and the shaft end 20. The other housing member 11 is centrally apertured as indicated at 23, and is undercut as indicated at 24 to accommodate a bearing 25 and a seal 26 encircling the shaft 21. An externally lobed rotor 27 is keyed to the shaft 21 for rotation therewith.

Figure 4:
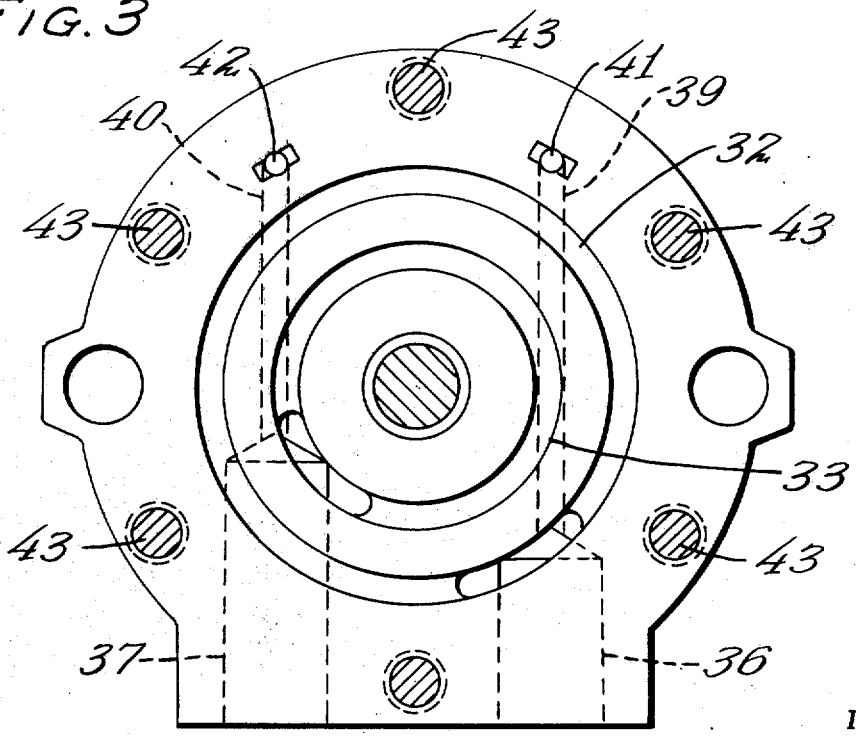
FIG. 4 is a horizontal sectional view through the apparatus showing the manifolds connecting the inlet and outlet ports, the position of the section being indicated by the line 4—4 of FIG. 1.

In the particular arrangement illustrated, the rotor 27 is provided with six external lobes. For the purpose of convenience, these lobes have been identified as L1, L2, L3, L4, L5, and L6 *a plurality of pairs of ports, each including a pressure port 30 and an exhaust port 31, are shown disposed around rotor 27. The number of pairs of pressure and exhaust ports is generally equal to one more than the number of internal lobes on rotor 27, or, in the illustrated example, seven pairs. Each of the ports 30 and 31 is disposed to lie on a radius greater than the radius of the outermost radius of the external lobe portions L1-L6 on rotor 27.* In view of the fact that the motor is completely reversible, the ports are interchangeable. In other words, what are described as the pressure ports may be used as exhaust ports to the return line if it is desired to rotate the motor in the opposite direction. For the purpose of description, the ports 30 may be considered as pressure ports, and the apertures 31 may be considered the exhaust or return line port. As is indicated in FIG. 4 of the drawings there is a circular manifold 32, and a smaller diameter circular manifold 33 in the bottom housing member 10, with matching manifold portions is the porting plate 13 as indicated in FIG. 1. Offset apertures 34 in the porting plate 13 connect the pressure port 30 with outer manifold 32. Inwardly offset apertures such as 35 connect the exhaust port 31 to the inner manifold 33.

As is also indicated in FIG. 4 of the drawings, a pressure passage 36 in the housing member 10 communicates with a source of fluid under pressure, and passage 37 communicates with a return line. The passage 36 communicates with the outer manifold 32 while the passage 37 communicates with an inner manifold 33. The passages 39 and 40 extend through check valves 41 and 42 to points outwardly of the manifold 32 to receive fluid under pressure which has built up outwardly of the manifold 32.

The various parts of the motor are secured together by bolts such as 43 which extend through the parts in angularly spaced relation.

When fluid pressure is introduced to the outer manifold 32, the area just to the left of the lobe L2 is subjected to fluid under pressure. This creates a tendency to rotate the rotor in a clockwise direction and to orbit the internally lobed member in a counter-clockwise direction. At the same time, pressure is also communicated to the area to the left of the lobe L3 in FIG. 2, also tending to expand this area and rotate the rotor in a clockwise direction. At this point, the lobe L4 is centrally located with respect to the open areas on opposite sides of this lobe, so that neither the pressure port or the exhaust port communicate to any substantial degree with these equally sized areas.

Figure 2:
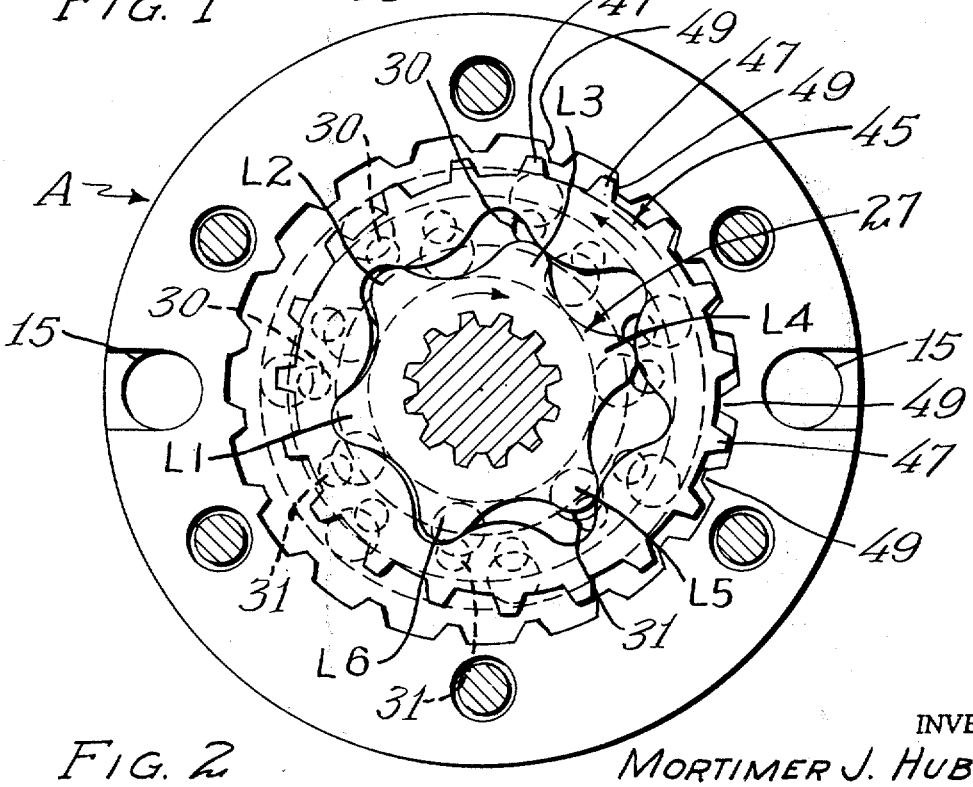
FIG. 2 is a cross-sectional view through the motor, taken along section line 2—2 of FIG. 1.
Figure 3:
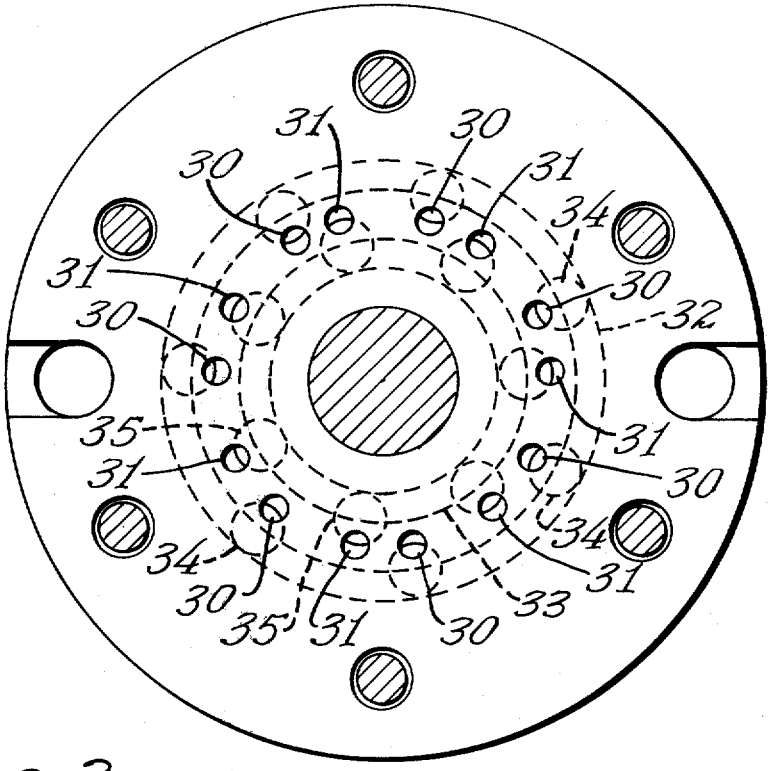
FIG. 3 is a cross-sectional view through the motor, showing the porting plate, the position of the section being indicated by the line 3—3 of FIG. 1.

It will be noted that the area on the clockwise side of lobe L5 is in communication with an exhaust port 31, and this is also true of the area on the clockwise side of the lobe L6. The lobe L1 is centrally located, and the areas on opposite sides of this lobe are leaving communication with the exhaust port and coming into communication with the pressure port respectively. As will be noted in FIG. 6 of the drawings, as well as FIG. 2 of the drawings, an internally lobed orbital member 45 cooperates with the rotor 27 to *valve or* guide the fluid from the pressure inlet to the return line, and to form a valve plate for controlling the flow of fluid through the various pressure ports 30 and exhaust ports 31. The orbital member 45 is provided with a number of internal lobes 46 which exceeds by 1 the number of external lobes on the rotor 27 *orbital member 45, therefore, is shown having internal lobes 46 equal in number to the pairs of ports 30 and 31. The innermost radius of internal lobe 46 about the center of orbital member 45 is less than the radius of ports 30 and 31 about the center of housing members 10 and 11.* The orbital member 45 also includes a series of equally angularly spaced teeth 47 on its outer surface which are cooperable to a similar number equally angularly spaced teeth 49 on the inner surface of the fluid chamber forming member 12. It will be noted that the space between the teeth 49 on the member 12 greatly exceeds the width of the teeth 47 on the orbital member 45. The reason for this arrangement will be obvious from an examination of FIG. 2 of the drawing. It will be noted that a tooth 47 of the orbital member 45 which is just to the right of the center line, FIG. 2, is coming into engagement with the surface of a tooth 49 on the member 12. The next successive tooth 47 in a clockwise direction is more firmly engaged with a tooth 49. The next successive tooth, in a clockwise direction, is somewhat spaced from the adjoining tooth 49. The tooth 47 which is at 90° angle from the first tooth mentioned is positioned centrally between a pair of teeth 49. Thus during the orbital movement of the member 45, the relative position of the teeth 47 and 49 vary, and it is necessary that the teeth 47 do not fit snugly between the teeth 49. However, due to the fact that there is always engagement between teeth 47 and 49, and due to the further fact that there are a similar number of teeth on both of these elements, the orbital member does not rotate about the axis of the rotor 27.

Figure 7:
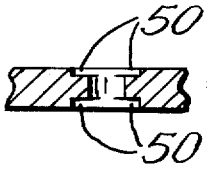
FIG. 7 is a sectional view through the orbital members shown in FIG. 6, the position of the section being indicated by the line 7—7 of FIG. 6.
Figure 6:
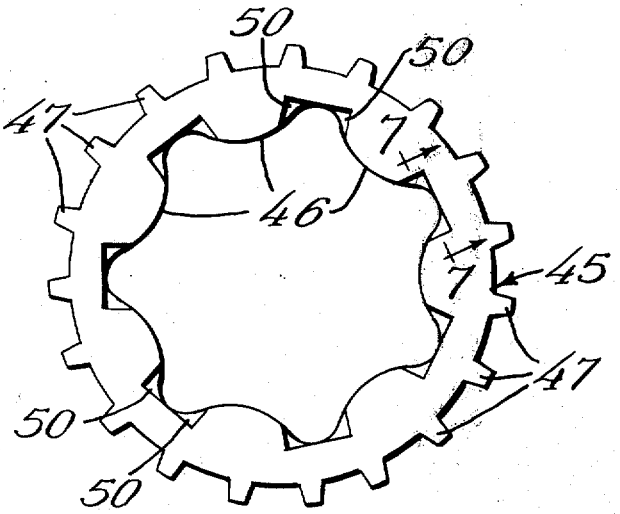
FIG. 6 is a plan view of an orbital member, showing the manner in which this member may be notched to prevent a trapping of fluid between the lobes.

As will be noted in FIGS. 6 and 7 of the drawings, the orbital member 45 is preferably provided with notches 50 on opposite sides of each lobe which act to prevent the trapping of the fluid between the rotor and the orbital member at any point of the rotation.

Figure 5:
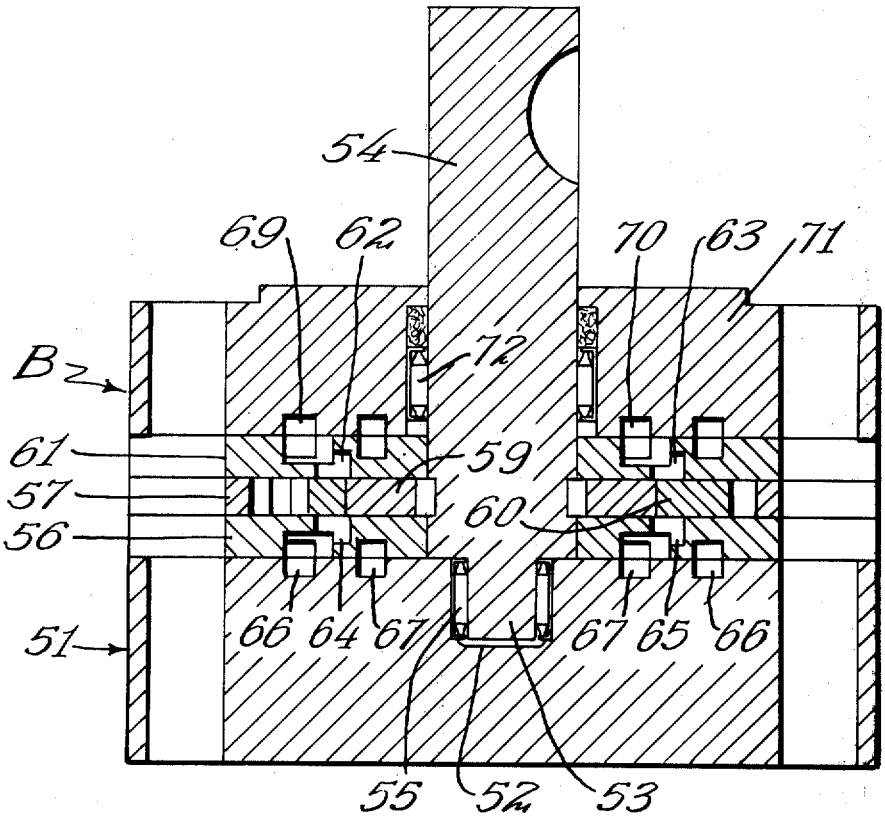
FIG. 5 is a view similar to FIG. 1 showing a motor having a porting plate on each side of the motor chamber.

FIG. 5 of the drawings illustrates a modified form of construction which is very similar to the structure previously described with the exception of the fact that entry or exit can be made from either side of the internally lobed member. The motor B illustrated in FIG. 5 includes a member 51 which is identical to the previously described body member 10, and includes a central socket 52 into which the reduced diameter and 53 of the shaft 54 is supported by a bearing 55. A porting plate 56 overlies the body member 51, and is identical to the porting plate 13 of the motor A. A chamber forming member 57 overlies the porting plate 56 and is identical to a chamber forming member 12 of the previously described motor A. An externally lobed rotor 59 identical to the rotor 27 is mounted upon the shaft 54 within the chamber forming member 57, and an internally lobed orbital member 60 identical to the orbital member 45 and circles the rotor 59 and is cooperable therewith. To this point, the parts described are all identical to the corresponding parts of the motor A. In the motor B, a second porting plate 61 substantially identical to the porting plate 56 but inverted with respect thereto overlies the chamber forming member 56 and includes pairs of ports 62 which are in axially aligned relation to ports 64 and 65 in the porting plate 56. As in the previous construction, the ports 64 and 65 are alternately connected to a manifold groove 66 which is concentric with the shaft 54, and the remaining ports 65 are connected to an inner circular manifold 67. In the same manner, the ports 62 which are in opposed relation to ports 66 are connected to an outer circular manifold 69 while the ports 63 which are in opposed relation to the ports 65 are connected to an inner circular manifold 70. With this arrangement, fluid under pressure may enter the spaces between the rotor 59 and the internally lobed orbital member 60, and fluid may be simultaneously forced from the spaces between the rotor and the orbital member on both sides thereof.

In other words, the motor B differs from the motor A in that the pressure is balanced on both of the rotor, greatly reducing the friction between the various parts. As will be noted, the manifolds 69 and 70 are in the upper body portion 71 through which the shaft 54 extends. A bearing 72 is interposed between upper body member 71 and the shaft 54 to support the shaft.

The motor B operates essentially the same as the motor A. The orbital member opens and closes one set of ports to admit fluid under pressure between the orbital member and the rotor. This tends to rotate in one direction, and to orbit the orbital member in the opposite direction. The orbital member is held from rotation by the external teeth on the orbital member and internal teeth on the orbital member and internal teeth on the chamber forming member. For each orbit of the orbital member, the rotor advances one lobe.

The motor has many uses. For example, the structure may be used as a valving system for power steering units of automotive vehicles. The unit is useful wherever hydraulic power is to be transmitted into rotary movement.

In accordance with the patent office statutes, I have described the principles of construction and operation of my improvement in hydraulic torque motor and while I have endeavored to set forth the best embodiment thereof, I desire to have it understood that changes may be made within the scope of the following claims without departing from the spirit of my invention.

I claim:

1. A hydraulic motor includes a housing defining a motor chamber, a rotor supported for rotation upon a shaft within said chamber, said rotor having angularly spaced external lobes thereupon, an orbital member encircling said rotor, internal lobes on said orbital member cooperable with the external lobes of said rotor, the number of internal lobes exceeding by one the number of external rotor lobes, and said housing having pairs of inlet and outlet ports, said inlet ports communicating with the areas between said lobes on said orbital member and rotor as these areas are increasing in size and being closed by said orbital member as said areas are decreasing in size and said outlet ports communicating with said areas as said areas decreasing in size and closed by said orbital member as said areas are increasing in size, and means on said orbital member directly engaging said rotor housing for holding said orbital member from rotation about the axis of said rotor.

2. The structure of claim 1 and in which said inlet and outlet ports are at a substantially common radius from said shaft axis.

3. The structure of claim 1 and in which the means for holding the orbital member from rotation comprises a similar number of teeth on said orbital member and said housing.

4. The structure of claim 3 and in which the width of the teeth on the orbital member is narrow relative to the width of the space between the teeth on said housing.

5. A hydraulic torque motor including:

a rotor housing defining a rotor chamber, a shaft supported by said housing and rotatable with respect thereto, an orbital member within said housing and having a series of angularly spaced lobes, an externally lobed rotor within said orbital member and mounted upon said shaft for rotation therewith, said orbital member having a greater number of lobes than said rotor and in mesh therewith to travel in an orbital path, said rotor rotating an angular distance for each orbit of said orbital member, means for closing the axial ends of the spaces between the lobes of said rotor and said orbital member, at least one of said closing means including angularly spaced inlet ports and outlet ports which are opened and closed by said orbital member whereby fluid under pressure may enter the spaces between certain of said lobes to cause rotation of said rotor and may leave the spaces between others of the lobes to permit rotation of said rotor, and means on said orbital member directly engaging said rotor housing for holding said orbital member from rotation about the axis of said shaft.

6. The structure of claim 5 and in which said means holding said orbital member from rotation includes external projection on said orbital member and cooperate internal projection on said housing.

7. The structure of claim 6 and in which said external projection and internal projection are equal in number.

8. The structure of claim 5 and in which both of said closing means include said inlet and outlet ports in opposed aligned relation whereby said orbital member is subjected to substantially equal and opposite forces.

9. The structure of claim 6 and in which said inlet ports are connected by a manifold, and said outlet ports are similarly connected by a manifold.

10. A hydraulic motor including:

a. a housing defining a motor chamber;

b. a rotor supported for rotation upon a shaft within said chamber, said rotor having angularly spaced external lobes thereupon;

c. an orbital member encircling said rotor, internal lobes on said orbital member cooperable with the external lobes on said rotor, the number of internal lobes exceeding by one the number of external rotor lobes;

d. means for holding said orbital member from rotation about the axis of said rotor, said means including cooperable portions on said orbital member and on said housing adapted for direct engagement; and e. means for communicating fluid to and from the areas between the lobes on said orbital member and said rotor as said areas are increasing and decreasing in size.

11. A hydraulic motor including:

a. a housing defining a motor chamber;

b. a rotor supported for rotation upon a shaft within said chamber, said rotor having angularly spaced external lobes thereupon;

c. an orbital member encircling said rotor, internal lobes on said orbital member cooperable with the external lobes on said rotor, the number of internal lobes exceeding by one the number of external rotor lobes;

d. means for holding said orbital member from substantial rotation about the axis of said rotor, said means including cooperable portions on said orbital member and on said housing adapted for direct engagement; and e. means for communicating fluid to and from the areas between the lobes on said orbital member and said rotor as said areas are increasing and decreasing in size.

12. The apparatus of claim 10 in which the motor chamber is cylindrical and the outer surface of the orbital member is substantially cylindrical and the means for holding the orbital member from rotation about the axis of the rotor includes cooperatively, directly inter-engaging portions extending radially inwardly of the cylindrical portions of the housing and radially outwardly of the cylindrical portion of the orbital member.

13. The apparatus of claim 11 in which the motor chamber is cylindrical and the outer surface of the orbital member is substantially cylindrical and the means for holding the orbital member from rotation about the axis of the rotor includes cooperatively, directly inter-engaging portions extending radially inwardly of the cylindrical portion of the housing and radially outwardly of the cylindrical portion of the orbital member.

14. A hydraulic torque motor including:

a. a rotor housing defining a rotor chamber;

b. a shaft supported by said housing and rotatable with respect thereto;

c. an orbital member within said housing and having a series of angularly spaced lobes;

d. an externally lobed rotor within said orbital member and mounted upon said shaft for rotation therewith; said orbital member having a greater number of lobes than said rotor and in mesh therewith to travel in an orbital path, said rotor [rotational] *rotating* an angular distance for each orbit of said orbital member;

e. means for closing the axial ends of the spaces between the lobes of said rotor and said orbital members, at least one of said means for closing the axial ends of the spaces including angularly spaced inlet ports and outlet ports which are opened and closed by said orbital member whereby fluid under pressure may enter the spaces between certain of said lobes to cause rotation of said rotor and may leave spaces between others of the lobes to permit rotation of said rotor; and f. means holding said orbital member from rotation about the axis of said shaft, said means including external projections on said orbital member and a like number of interal projections on said housing directly engaging said external projections.

15. The apparatus of claim 14 in which the internal and external projections are comprised of a plurality of equally angularly spaced teeth.

*16. The apparatus of claim 1 in which the ports are disposed on a radius greater than the radius of the external rotor lobes.*

*17. The apparatus of claim 2 in which the ports are disposed on a radius greater than the radius of the external rotor lobes.*

*18. The apparatus of claim 3 in which the ports are disposed on a radius greater than the radius of the external rotor lobes.*

*19. The apparatus of claim 4 in which the ports are disposed on a radius greater than the radius of the external rotor lobes.*

*20. The apparatus of claim 5 in which the ports are disposed on a radius greater than the radius of the external rotor lobes.*

*21. The apparatus of claim 6 in which the ports are disposed on a radius greater than the radius of the external rotor lobes.*

*22. The apparatus of claim 7 in which the ports are disposed on a radius greater than the radius of the external rotor lobes.*

*23. The apparatus of claim 8 in which the ports are disposed on a radius greater than the radius of the external rotor lobes.*

*24. The apparatus of claim 9 in which the ports are disposed on a radius greater than the radius of the external rotor lobes.*

*25. The apparatus of claim 14 in which the ports are disposed on a radius greater than the radius of the external rotor lobes.*

*26. The apparatus of claim 15 in which the ports are disposed on a radius greater than the radius of the external rotor lobes.*

*27. A fluid energy translating device, comprising: an outer member having a chamber therein, an internally toothed gear member in said chamber, said chamber and internally toothed member having cooperating surfaces permitting orbital movement of said toothed member within said chamber, an externally toothed gear member rotatably mounted on an axis fixed with respect to said outer member with teeth operatively engaging the teeth on the internally toothed member, said teeth defining expanding and contracting fluid chambers as the internally toothed member orbits and the externally toothed member rotates about its own axis, valve means for porting fluid to and from the fluid chambers including inlet port means and outlet port means, a valve plate sealingly engaging one side of said toothed members, a plurality of ports in said plate generally annularly arrayed about the axis of the externally toothed member, said ports being equal to a number evenly divisible by the number of teeth on the internally toothed gear member, said ports being disposed on a diameter greater than the diameter of the teeth crests of the internally toothed member and cooperable with the orbiting internally toothed member to effect communication with said chambers, and means connecting said ports with at least one of said port means.*

*28. A fluid energy translating device as defined in claim 27, wherein each of said ports serially communicates with each of said chambers.*

*29. A fluid energy translating device as defined in claim 27, wherein the cooperating surfaces include internal teeth in said chamber, and an equal number of exter-*

*nal teeth on said internally toothed member in operational engagement therewith.*

*30. A fluid energy translating device as defined in claim 27, wherein said ports are positioned to be opened and closed by the teeth on the internally toothed member.*

*31. A fluid energy translating device as defined in claim 30, wherein each of said ports is positioned to be opened and closed by only one of said teeth on the internally toothed member.*

*32. A fluid energy translating device, comprising: an outer member having a chamber therein, an internally toothed gear member in said chamber, said chamber and internally toothed member having cooperating surfaces permitting orbital movement of said toothed member within said chamber, an externally toothed gear member rotatably mounted on an axis fixed with respect to said outer member with teeth operatively engaging the teeth on the internally toothed member, said teeth defining expanding and contracting fluid chambers as the internally toothed member orbits and the externally toothed member rotates about its own axis, and valve means for porting fluid to and from the fluid chambers including inlet port means and outlet port means, a valve plate sealingly engaging one side of said toothed members, a plurality of ports in said plate generally annularly arrayed about the axis of the externally toothed member, said ports being disposed on a diameter greater than the diameter of the teeth crests of the internally toothed member to effect communication with said chambers, means connecting said ports with at least one of said port means, said ports lying on a circle greater in diameter than the root diameter of the teeth on said internally toothed member, and a plurality of slots in the side of internally toothed member adjacent said valve plate and communicating with said chambers, said slots extending radially a sufficient distance to serially communicate with said ports.*

*33. A fluid energy translating device, comprising: an outer member having a chamber therein, an internally toothed gear member in said chamber, said chamber and internally toothed member having cooperating surfaces permitting orbital movement of said toothed member within said chamber, an externally toothed gear member rotatably mounted on an axis fixed with respect to said outer member with teeth operatively engaging the teeth on the internally toothed member, said teeth defining expanding and contracting fluid chambers as the internally toothed member orbits and the externally toothed member rotates about its own axis, and valve means for porting fluid to and from the fluid chambers including inlet port means and outlet port means, a valve plate sealingly engaging one side of said toothed members, a plurality of ports in said plate generally annularly arrayed about the axis of the externally toothed member, said ports being disposed on a diameter greater than the diameter of the teeth crests of the internally toothed member and cooperable with the orbiting internally toothed member to effect communication with said chambers, means connecting said ports with at least one of said port means, a casing surrounding toothed members, said chamber being generally cylindrical and defined in said casing, an output shaft rotatably mounted in said casing and rotatably fixed to said externally toothed member, said inlet and outlet ports means including an inlet port and an port in said casing, said valve plate ports being equal in number to twice the number of teeth on said internally toothed member, means connecting alternate ones of said valve plate ports to said inlet port, and means connecting the other valve plate ports to said outlet port.*

*34. A fluid energy translating device, comprising: an outer member having a chamber therein, an internally toothed gear member in said chamber, said chamber and internally toothed member having cooperating surfaces permitting orbital movement of said toothed member within said chamber, an externally toothed gear member rotatably mounted on an axis fixed with respect to said outer member with teeth operatively engaging the teeth on the internally toothed member, said teeth defining expanding and contracting fluid chambers as the internally toothed member orbits and the externally toothed member rotates about its own axis, and valve means for porting fluid to and from the fluid chamber including inlet port means and outlet port means, a valve plate sealingly engaging one side of said toothed members, a plurality of ports in said plate generally annularly about the axis of the externally toothed member, said ports being disposed on a diameter greater than the diameter of the teeth crests of the internally toothed member and cooperable with the orbiting internally toothed member to effect communication with said chambers, means connecting said ports with at least one of said ports means, a casing surrounding toothed member, said chamber being generally cylindrical and defined in said casing, an output shaft rotatably mounted in said casing and rotatably fixed to said externally toothed member, said inlet and outlet port means including an inlet port and an outlet port in said casing, said valve plate ports being equal in number to twice the number of teeth on said internally toothed member, means connecting alternate ones of said valve plate ports to said outlet port, and the number of teeth on said externally toothed member being one less than the number of teeth on the internally toothed member.*

* * * * *